US005968167A

United States Patent [19]

Whittaker et al.

[11] Patent Number: 5,968,167

[45] Date of Patent: Oct. 19, 1999

[54] MULTI-THREADED DATA PROCESSING MANAGEMENT SYSTEM

[75] Inventors: James Robert Whittaker; Paul Rowland, both of Herts, United Kingdom

[73] Assignee: Videologic Limited, Hertfordshire, United Kingdom

[21] Appl. No.: 08/834,808

[22] Filed: Apr. 3, 1997

[51] Int. Cl.[6] .................... G06F 13/00

[52] U.S. Cl. .................... 712/225

[58] Field of Search .................... 710/131, 240, 710/1, 200, 100, 5; 712/225

[56] References Cited

U.S. PATENT DOCUMENTS

| | | | |
|---|---|---|---|
| 4,542,455 | 9/1985 | Demeure | 395/674 |
| 5,307,496 | 4/1994 | Ichinose et al. | 395/674 |
| 5,487,153 | 1/1996 | Hammerstrom et al. | 395/670 |
| 5,511,002 | 4/1996 | Milne et al. | 364/514 R |
| 5,684,987 | 11/1997 | Mamiya et al. | 395/614 |
| 5,689,674 | 11/1997 | Griffith et al. | 395/393 |
| 5,699,537 | 12/1997 | Sharangpani et al. | 395/393 |
| 5,748,921 | 5/1998 | Lambrecht et al. | 395/308 |

FOREIGN PATENT DOCUMENTS

| | | |
|---|---|---|
| 0 020 202 | 12/1980 | European Pat. Off. . |
| 0 367 639 | 5/1990 | European Pat. Off. . |
| 0 397 180 | 11/1990 | European Pat. Off. . |
| WO 94/15287 | 7/1994 | WIPO . |

*Primary Examiner*—David Y. Eng

*Attorney, Agent, or Firm*—Flynn, Thiel, Boutell & Tanis, P.C.

[57] ABSTRACT

A data processing management system for controlling the execution of multiple threads of processing instructions such as the instructions that are employed to process multimedia data. The management system includes a media control core, a number of data processing units and a multi-banked cache. For the processing instruction for each thread, the multimedia core identifies the data processing operation to be executed as well as the resources needed to execute that operation. The multimedia core then determines for each instruction if all the resources are available to execute the operation. For the operations for which all the resources are available, the multimedia core then determines which operation has the highest priority. The operation having the highest priority is then passed to one of the data processing units for execution. The data and addresses upon which the data processing units act are temporarily stored in the multi-banked cache. Data are written into the cache from multiple input ports. Data are read from the cache out through multiple output ports.

30 Claims, 7 Drawing Sheets

MULTI-THREADED DATA PROCESSING MANAGEMENT SYSTEM

This invention relates to a data processing management system of the type which can be used with real time multimedia inputs and processing.

BACKGROUND TO THE INVENTION

The user interface to computers has continually evolved from teletypes to keyboard and character terminals to the (graphical user interface) GUI which is currently the standard interface for the majority of computer users. This evolution is continuing with sound and 3D graphics increasingly common and 3D sound and virtual reality emerging. It's common thread is an increase in the complexity of the human computer interface achieved by an accompanying is increase in the types of data presented to the user (personal computer) PC applications are taking advantage of this shift and are increasingly relying on the availability of sound and 3D graphics in order to achieve their full potential.

This has resulted in chip and board suppliers offering products with combined functionality designed to handle more than one data type e.g. 2D graphics and sound or 2D and (motion picture experts group) MPEG playback. it is important to note that these products to date use separate functional units for each data type.

More recently, programmable SIMD (Single Instruction Multiple Data) architectures (e.g. Chromatics MPACT) have emerged. These architectures use identical processing elements executing the same instruction to perform the same processing on a number of blocks of data in parallel. This approach works well for data which can be easily partitioned to allow a common function to be performed e.g. block processing in data compression such as MPEG, but are not flexible enough to execute a complete general algorithm which often requires conditional flow control within the data processing.

DSP (digital signal processor) vendors have also sought to address this market with MIMD (Multiple Instruction Multiple Data) devices (e.g. Texas Instruments' TI320C80) which offer the required flexibility to process the varied data types. However since the architecture replicates general purpose DSP cores which retain a far greater degree of flexibility than required for the application, the resulting chip is a high cost device, too high for general PC and consumer use.

CPU (central processing unit) vendors promoting fast RISC CPUs for both general purpose programs and multimedia processing are unable (and do not wish) to compromise their architecture in order to support more than a few multimedia specific instructions and therefore do not achieve the required performance levels at a reasonable cost. As the CPU is also typically being used to run a non-real-time operating system, it is also unable to provide low latency processing.

Dedicated multimedia CPUs (e.g. Philips' Trimedia) using VLIW (very long instruction words) instructions controlling multiple processing units are unable to make efficient use of their processing power because each instruction is dedicated to a single task (and data type) and therefore unable to make optimal use of all the processing units available. For example a VLIW instruction dedicated to a 3D graphics operation is unable to take advantage of hardware designed for MPEG motion estimation. The number of processing units, and therefore scale-ability, is also limited by the VLIW word length.

SUMMARY OF THE INVENTION

Preferred embodiments of the present invention address the requirement for a device which processes all multimedia data types in a manner that minimises system costs and provides for future developments in multimedia and the related industry standards. They provide an architecture which is scalable in processing power, real-time I/O support and in the number of concurrent activities which can be undertaken.

All multimedia data types may be viewed as streams of data which lend themselves to a vector processing approach. Some of these streams will be real time (e.g. from an audio or video input) and as such either require dedicated buffering or low latency processing to avoid data loss. Each data stream also requires some hardware resource so that it may be processed.

A preferred embodiment of the invention includes a low latency real-time processing core responsible for data IO and task scheduling only. This avoids the need for unnecessary and costly buffering. It also includes a method of dynamic resource checking to ensure that only tasks with the required resources available are run.

The balance between host processing power, memory costs and silicon costs is also continually changing. This means that the optimal division of work between a host processor and multimedia coprocessor also changes over time. This device is programmable to allow the division of work to be altered as required.

Scale-ability of parallel processing devices is a problem for both hardware design and supporting software. As more processing units are added to a device the distribution of tasks between the processing units becomes more difficult resulting in either a diminishing return or an exponential growth in the number of inter-connects between functional units. Such changes also typically result in alterations to the programming model for the device requiring wholesale changes to the supporting software. Preferred embodiments of the invention address these issues by a consistent scalable architecture, where all the elements may be scaled without creating an explosion of inter-connects between functional units and without changing the programming model presented to software interfacing to the device.

FIG. 1 shows the base architecture of the device.

The device has been conceived as a re-configurable engine able to match all the current and future algorithms required to process multimedia data. The work done by it is split into two categories. Both real time scheduling and IO processing are performed by a Media Control Core whilst computationally intensive data processing is performed by one or more additional data processing units.

This division of work is one of the architecture's fundamental characteristics.

Data processing consists of a number of steps:

Parameter fetching and setup

Data fetching and processing

Data storage

In order to efficiently achieve high data processing throughput a processor needs to perform the above operations on a reasonably large set of data. If the data set is too small the processor spends too high a proportion of it's power on context switching between tasks and the resulting need to save and restore a thread's state.

Because the Media Control Core is required only to service requests to move data between IO ports and memory (to allow data processing to be performed) it can context switch every clock cycle, this then removes the need for large data buffers to support real time IO. Data processing units are able to process data efficiently by performing a key part of an algorithm on data without interruption.

These processing elements are supported by a scalable multibank cache which supports efficient data movement and processing by caching sets of data required for the active algorithms being run.

The invention is defined in its various aspects with more precision in the appended claims to which reference should now be made.

BRIEF DESCRIPTION OF THE DRAWINGS

A preferred embodiment of the invention will now be described in detail, by way of example, with is reference to the figures in which.

DETAILED DESCRIPTION

Figure 1:
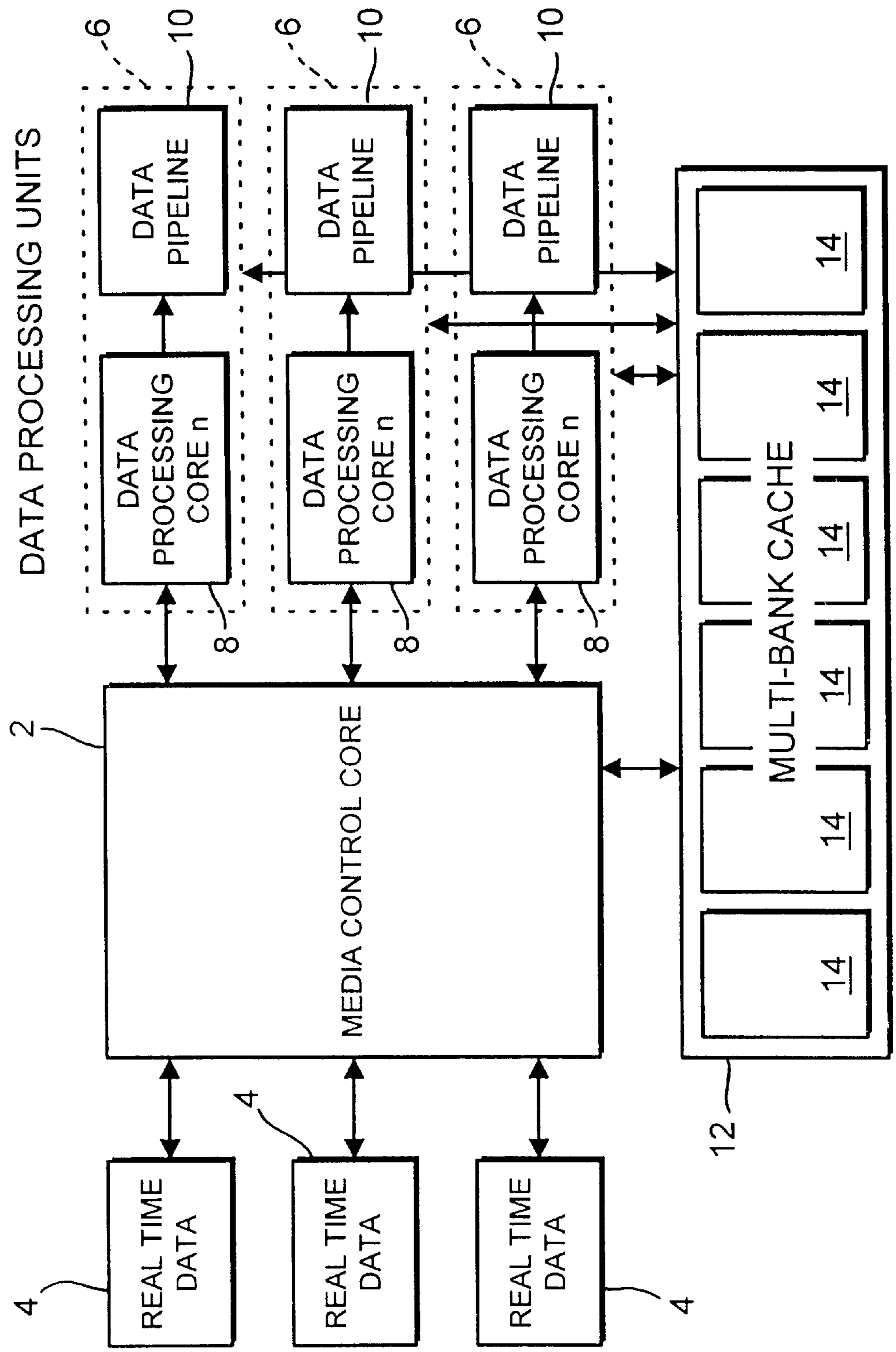
FIG. 1 shows a block diagram of an embodiment of the invention.

The base architecture of the embodiment of the invention is shown in FIG. 1. The centre of the system is a media control core (MCC) 2. This is a fine grained multithreading processor. This has a plurality of inputs and outputs which can be coupled to real time data input and output devices 4. These can be, for example, video sources, audio sources, video outputs, audio outputs, data sources, storage devices etc. In a simple example only one input and one output would be provided.

Also coupled to the media control core 2 are a plurality of data processing units 6. Each of these comprises a data processing core 8 which controls the processing of data via data pipeline 10. The core 8 is decodes and sequences microinstructions for the pipeline 10.

Also coupled to the media control core 2 is a multibanked cache memory 12 from which data may be retrieved by the media control core 2 and data processing units 6 and into which data may be written by the media control core, the data processing units 6.

The media control core is a fine grained multithreading processing unit which directs data from inputs to data processing cores or to storage and provides data to outputs. It is arranged so that it can switch tasks on every clock cycle. This is achieved by, on every clock cycle checking which of the possible operations it could perform have all the resources available for those tasks to be executed and, of those, which has the highest priority. It could be arranged to commence operation of more than one operation on each clock cycle if sufficient processing power were provided.

This resource checking ensures that everything required to perform a particular task is in place. This includes external resources such as whether or not data is available at an input port (EG video data) or whether a data storage device or output is available. It also includes internal resources such as data banks for temporary storage, available processing cores which are not currently working on other data or previously processed data required for a particular new processing operation. The media control core operates to direct data from an input to an appropriate data processing unit 6 for processing to take place and routes data to an output when required making use of the cache as necessary. Once execution of a set of instructions has commenced on a data processing unit 6, the MCC can look again at the various threads it can run and the resources available for these whilst the program continues to run on the data processing unit.

The resource and priority checking of the media control core means that tasks which serve as real time data such as video input are able to be performed without the large memory buffers which are usually required in current real time inputs. In operation such as video input the media control core will look to see whether data is available at the IO port and, if it is, will receive that data and send it either to a portion of the multibanked cache or to data storage registers in preparation for processing by the one of the data processing unit 6.

The data processing units 6 are all under the control and scheduling of the media control core 2. In the example shown in FIG. 1 the units consist of a processing pipeline (data pipeline 10) which will be made up of a number of processing elements such as multipliers, adders, shifters etc under the control of an associated data processing core 8 which runs a sequence of instructions to perform a data processing algorithm. Each of these data processing cores will have its own microinstruction ROM and/or RAM storing sequences of instructions to perform a particular data processes. The media control core invokes the data processing unit 6 to perform its particular operation sequence by, for example, passing an address offset into the unit's microinstruction ROM and instructing the data processing unit to commence execution. The data processing unit 6 will then perform a particular process on either data from the multibanked cache or data passed to it from one of the inputs to the media control core until completed when it will signal to the media control core that its processing is complete.

The multibanked cache 12 of FIG. 1 is used for memory accesses and these are all cached through this bank. The cache is divided into a plurality of banks 14 each of which can be programmed to match the requirements of one of the data processing tasks being undertaken. For example, a cache bank might be dedicated to caching texture maps from main memory for use in 3D graphics rendering. Using this programmability of the cache banks allows the best possible use of on chip memory to be made and allows dynamic cache allocation to be performed thereby achieving the best performance under any particular conditions.

Furthermore, the use of multiple cache banks allows the cache to be non-blocking. That is to say, if one of the cache banks is dealing with a request which it is currently unable to satisfy, such as a read instruction where that data is not currently available, then another processing thread which uses a separate cache bank may be run.

The entire device as shown in FIG. 1 is scalable and may be constructed on a single piece of silicon as an integrated chip. The media control core 2 is scalable in a manner which will be described below with reference to FIG. 2. As the size of the media control core is increased it is able to support further data processing units 6 whilst using the same programming model for the media control. More cache banks may also be added to support the further data processing units thereby increasing the effectiveness of the data throughput to the media control core and the data processing units. Because the programming model of the device is not changed this enables a high degree of backwards compatibility to be attained.

Figure 2:
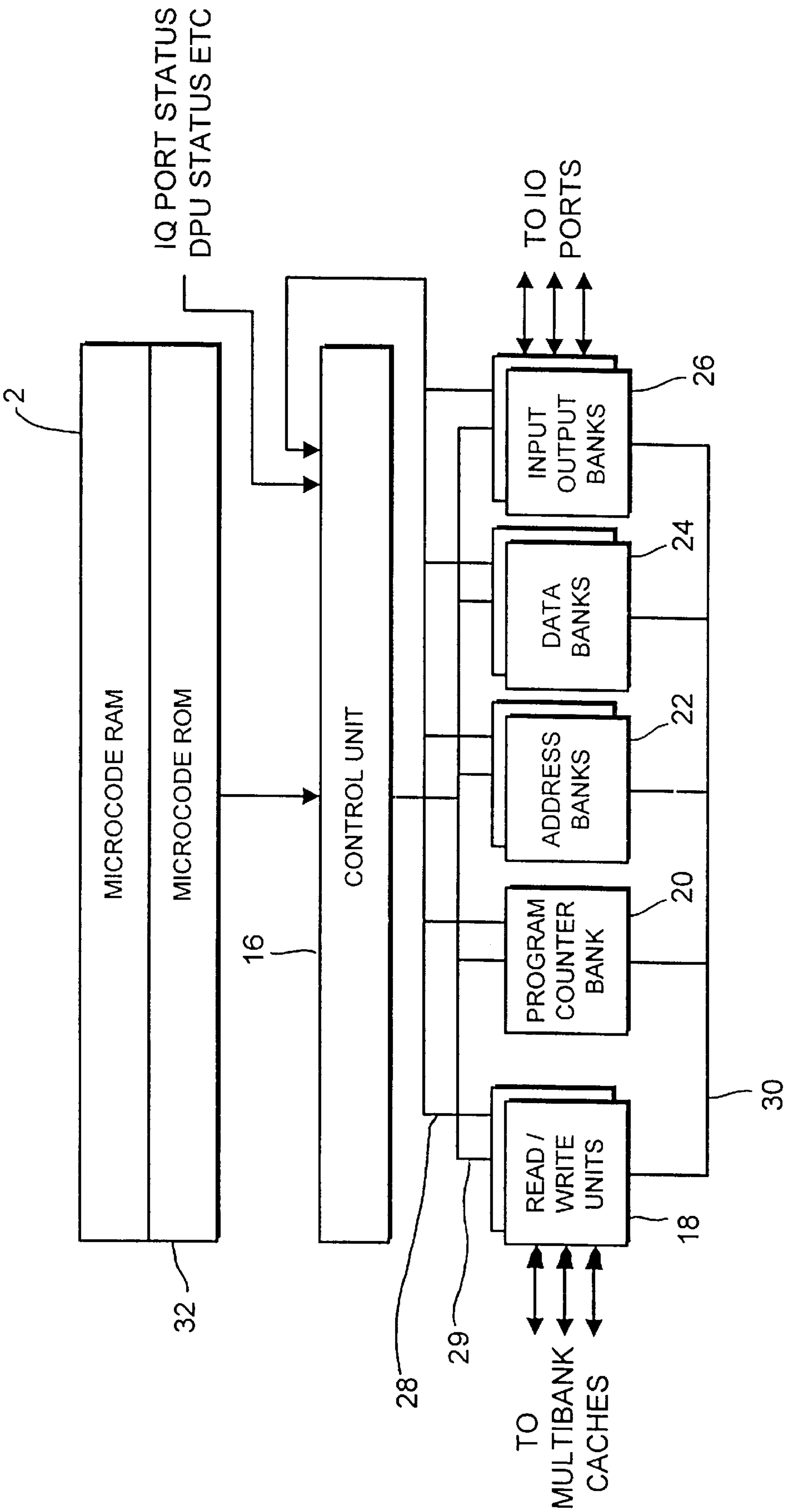
FIG. 2 shows a block diagram of the Media Control Core of FIG. 1.

The media control core is shown in more detail with reference to FIG. 2. It is composed of a control unit 16, a set of read/write units 18, a set of program counter banks 20, a set of address banks 22, a set of data banks 24, and a set of input/output banks 26. These banks are all coupled together by a media control core status bus 28 a media control core control bus 29 and a media control core data interconnect bus 30. The media control core data interconnect bus 30 is used for sending data between the various different banks and the status bus provides data such as the input/output port status and the status of data processing units to which the media control core can send instructions and data.

In addition, a memory block 32 storing microcode instructions in ROM and RAM is coupled to the control unit 16 the units 18 to 26 listed above.

All the core components, 18 to 26, with the exception of the control unit 16, have the same basic interface model which allows data to be read from them, written to them and operations performed between data stored in them. Each bank consists of a closely coupled local storage register file with a processing unit or arithmetic logic (ALU).

The control unit 16 is used to control the execution of the media control core. On each clock cycle, control unit 16 checks the availability of all resources (e.g. input/output port status, data processing units status, etc) using status information provided over the media control status bus 28 against the resources required to run each program under its control. It then starts execution of the instruction for the highest priority program thread which has all its resources available.

The program counter bank 20 is used to store program counters for each processing thread which is supported by the media control core. It consists of a register for each of the processing threads which the media control core is capable of supporting and an ALU which performs all operations upon the program counters for program progression, looping, branching, etc. The data banks 24 are used for general purpose operations on data to control program flow within the media control core They are a general resource is which can be used as required by any processing thread which is running on the MCC.

The address banks 22 are used to store and manipulate addresses for both instructions and data and are also a general MCC resource in a similar manner to the data banks 24.

The input/output banks 26 provide an interface between the media control core and real time data streams for input/output which are supported by the MCC. Their status indicates the availability of data at a port, eg. video input, or the ability of a port to take the data for output. They can, as an option, include the ability to transform data as it is transferred in or out, for example bit stuffing of a data stream.

The read/write banks 18 provide an interface between the media control core and memory (via the multibank cache). As more than one processing thread can be run at any one time more than one read/write unit is required to avoid the blocking of memory requests.

The media control core is scalable in all important respects. Because it is constructed from banks which localise storage (register files) and processing (ALU) additional banks can be added without creating any unmanageable routing and interconnection problems. The number of processing threads which could be supported can be increased by adding registers to the program counter bank and modifying the control unit accordingly. The number of input/output streams which can be supported by the MCC can be increased by adding further IO banks.

The data throughput can be increased by adding further read/write units 18 and the MCC processing power overall can be increased by adding further data and address banks, 24 and 22, respectively.

Figure 3:
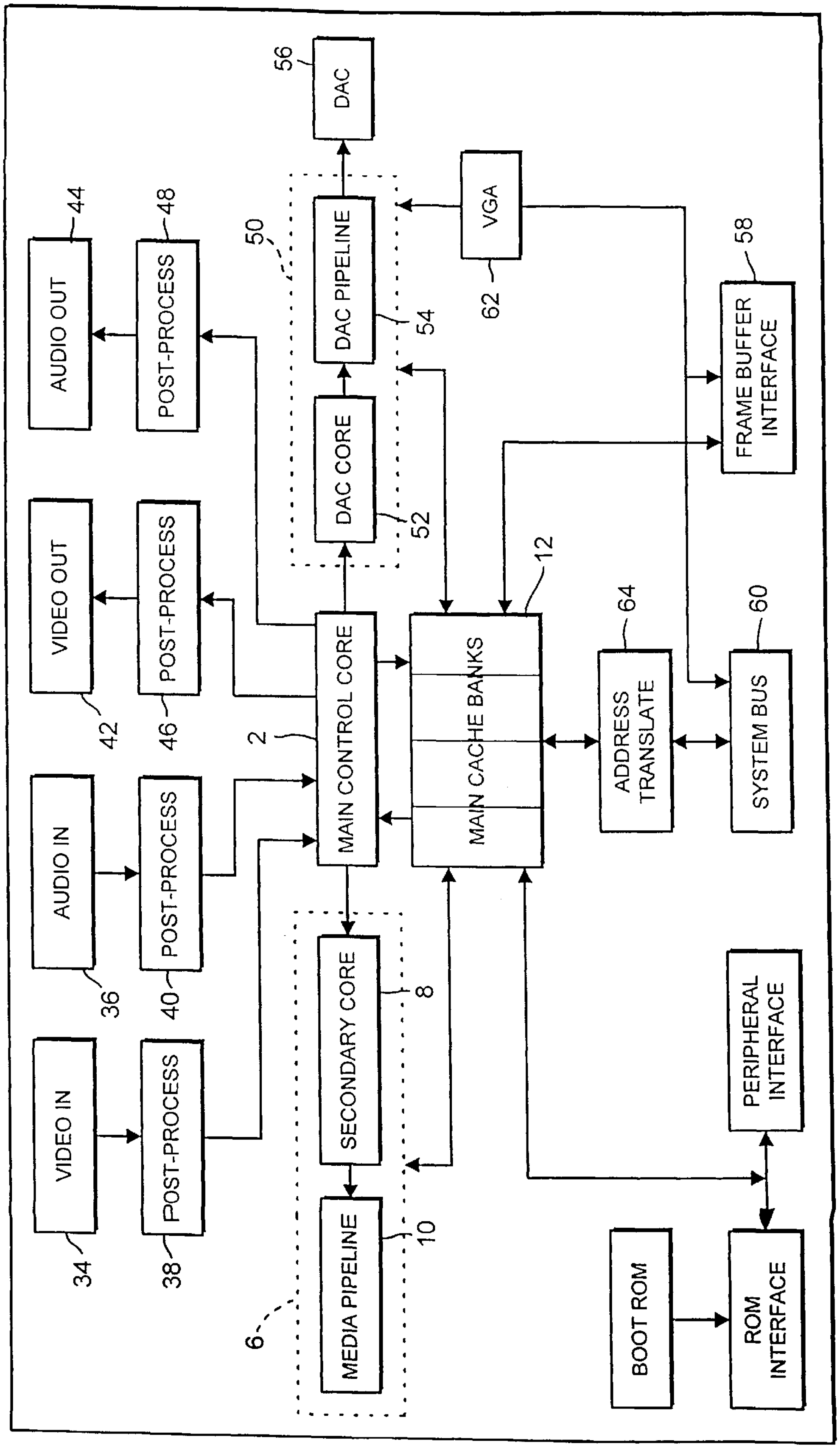
FIG. 3 is a block diagram of a second embodiment of the invention.

A block diagram of a specific implementation of the data processing management system is shown in FIG. 3. The MCC in this serves as a plurality of real time data input/output ports and controls data processing units to process data received from them and output to them.

In the figure is shown a video input 34 and audio input 36 coupled to the media control core via associated preprocessors 38 and 40. A corresponding video output 42 and audio output 44 are coupled to the media control core 2 via respective post processors 46 and 48. The video and audio inputs and outputs may be digital inputs and outputs.

As in FIG. 1 the media control core 2 is coupled to a multibanked cache 12 in this case referred to as the main cache bank. A data processing unit 6 comprising a secondary core 8 and a data (media) pipeline 10 are coupled directly the media control core and are used for processing of data supplied to them.

Also coupled to the media core 2 is a processing unit 50 comprising a digital to analog converter feed core (DAC feed core) 52 and a DAC feed pipeline 54 which supplies data to a digital to analog converter 56. The purpose of this is to provide a graphics output. To this end, the processing unit 50 fetches data via the frame buffer interface 58 and system bus 60 for the host computer video graphics adaptor (VGA 62) is retained for compatibility only. Thus, real time data is supplied on the video and audio inputs and can be sent out on the video and audio outputs whilst graphics output can be sent by the DAC 56.

Data for graphics output can be generated by processing non-real time data from a source such a graphics frame buffer, a connection to which is shown in FIG. 3 via the frame buffer interface 58, 3D data, or real time video.

The secondary data processing core 8 and media pipeline 10 is an example of a data processing unit which is able to process audio, 3D, 2D, video scaling, video decoding etc. This could be formed from any type of general processor.

The DAC feed core and DAC feed pipeline is dedicated to processing data from a number of frame buffers for the generation of RGB data for a DAC. It can switch between source buffers on a pixel by pixel basis, thus converting data taken from a number of video formats including YUV and combining source data from multiple frame buffers by blending or by colour or chroma keying.

Each core will have an associated microcode store formed from ROM and RAM which for the purposes of clarity are not shown here, but which stores instructions to be executed by the processor The cache banks 12 interface to the media control core and the data processing units 6 and 50. They also interface to the system bus via an address translation unit 64. They are also linked to the frame buffer interface 58 for writing data to and reading data from one or more frame buffers.

Figure 5:
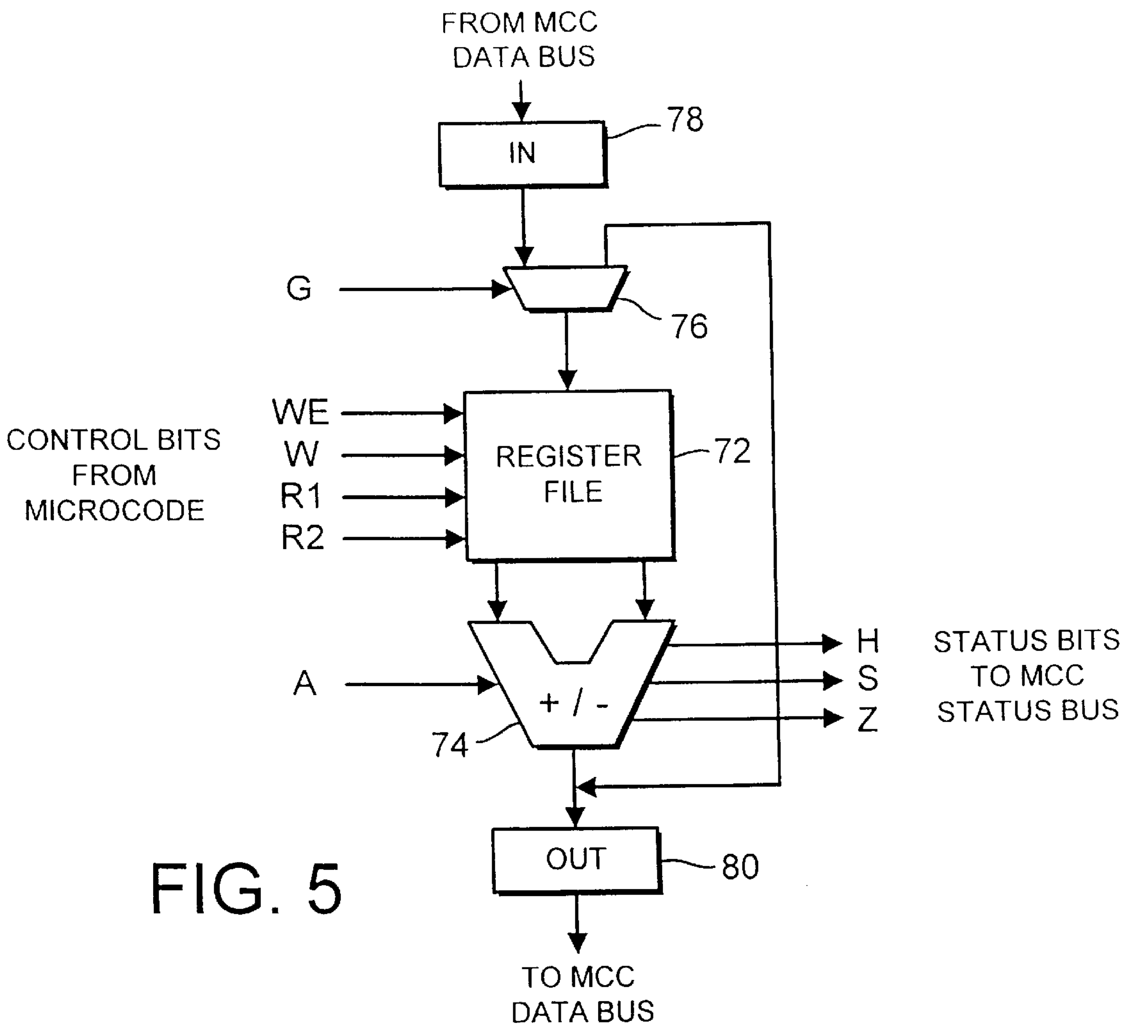
FIG. 5 is a block diagram of the internal architecture of one of the data banks of FIG. 4.

A data bank 24 is illustrated in FIG. 5. It comprises a register file 72, an ALU 74, and a multiplexed input 76. The operation of the data bank is controlled by a number of bits in a microinstruction which are labelled WE, W, R1, and R2 and which are input to the register file. The result of the micro-instruction which is performed by the ALU is made available as status bits H S Z which are routed to the control unit of the media control core to implement branches and conditional instructions The register file is constructed to allow two operands to be fetched from the input and one operand to be written to the output on each clock cycle. The data input port 78 and the data output port 80 allow communication with other data via the media control core data bus 30 to which they are connected. Thus, the data flow in FIG. 5 is vertically down through the diagram whilst the flow of control information is from left to right being formed of control bits from the control unit and status bits sent back to the control unit reflecting the status of the data bank.

A plurality of these data banks are used and each is in the same form, that is to say each has its is own register file closely coupled to an ALU as shown in FIG. 5. This arrangement, using a plurality of closely coupled registers and ALU's, preferably in a one to one relationship, differs from prior art embodiments of multiple ALU's where complex multiplexing between register banks and multiple ALU's was required.

Generally, these data banks perform general purpose operations on data thereby controlling program flow within the MCC and can be used by any processing thread which is running on the MCC.

The address banks 22, the program counter banks 20, and the IO banks 26, and the read/write units 18 are all constructed and operate in a similar manner but are provided in separate units to allow their implementation to be optimised, thereby reflecting the way in which they are used.

The address banks 22 store and manipulate addresses for data accesses into memory (not illustrated). They are slightly simpler than the data banks in that they use unsigned accumulators and do not generate any condition codes to send back to the control unit 16 via the status bus.

The program counter bank 20 is used to store the program counter for each processing thread supported by the media control core. Thus, the number of registers in the bank of the type shown in FIG. 5 will be equivalent to the number of processing threads which the MCC can support. As with the address banks the ALU is used to program counter operations and is unsigned. It does not generate conditions codes to send back to the control unit 2.

The IO banks 26 are used to interface to IO ports, and contain no registers or ALU's. They interface with real time data streams supported by the MCC. A status signal indicates the availability of data at a port, or the ability of a port to take data. They can optionally include the ability to transform the data as it is transferred.

The read/write units 18 interface to the cache bank 12. They have no registers or ALU's. A read unit accepts an address and, when the data is returned, sets a data valid status bit. A write unit accepts addresses and data. Multiple read and write units are used to ensure that if one cache access blocks then another thread can be continued running through another read/write unit.

An instruction buffer with the control unit (not illustrated) for each data processing thread stores that thread's next microinstruction and instruction operands. The instruction and operands include bits which describe the resources required to execute that instruction. These resource requirements are fed into the control unit's resource checking logic along with status bits describing the current status of the Media Control Core 2, external 10 ports 20 and data processing units 6,50. Simple combinatorial logic such as an array of logic gates determines whether an instruction can run or not and a fixed priority selector in the control unit 16 then launches the highest priority runnable thread into the data path control pipeline (shown in FIG. 4) to start execution of that program thread. The threads task could be 'receive video data', process stored audio data' etc.

Normally an instruction will request its thread's next instruction to be read from memory when it is run. The instruction is read from memory (pointed to by the program counter) which contains an instruction opcode and operands. The opcode field of the instruction is used to index into the microcode ROM to retrieve the next instruction and the resultant microinstruction is stored into the thread's instruction buffer together with the instruction operand fields.

Figure 6:
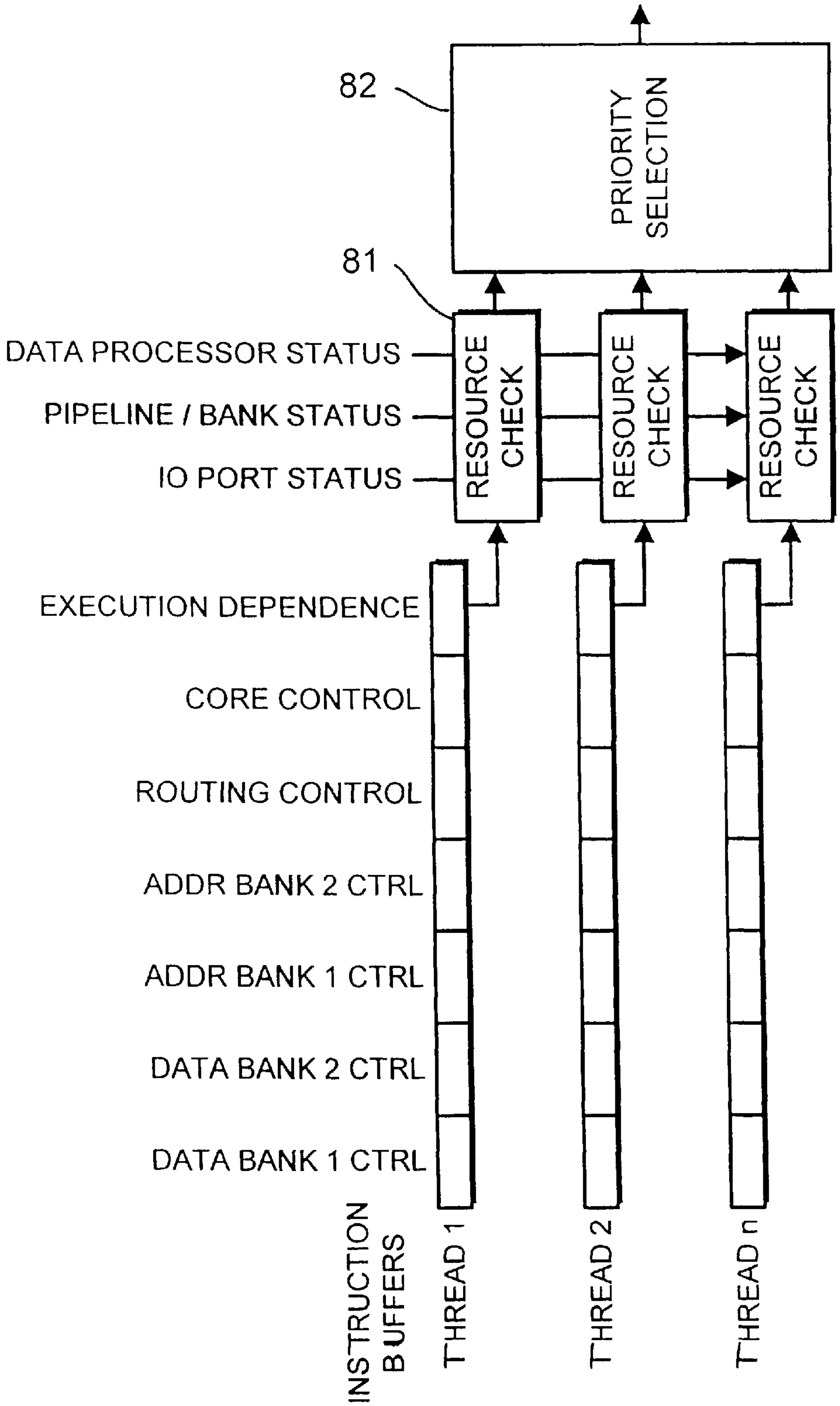
FIG. 6 shows in block form how resource checking and thus process selection is performed by the Media Control Core.

The resource checking and priority is illustrated fully in FIG. 6 For the three threads illustrated, global status information is received from the necessary data banks, the necessary address banks, routing control data from the control unit, control status information from control unit 16, and execution dependency data from other processes on which a particular thread is dependent. All this information is sent to a resource checker 81 which combines it with data from 10 ports, the various pipeline data bank status, and the status of the various data processing units. This happens for each possible thread. If it is possible to run that data processing thread then an output is generated to a is priority selector 82. This has information about the priority of each of the data processing threads supported and, as a result, can select for execution the thread with highest priority. For example, a real time data input such a video would be given a high priority and this would take precedence over a background processing operation.

Because the next instruction for a thread is already provided in an instruction buffer that instruction is always available for resource checking and priority selection. Thus, there is no loss of execution time by checking the status of every clock cycle.

Figure 4:
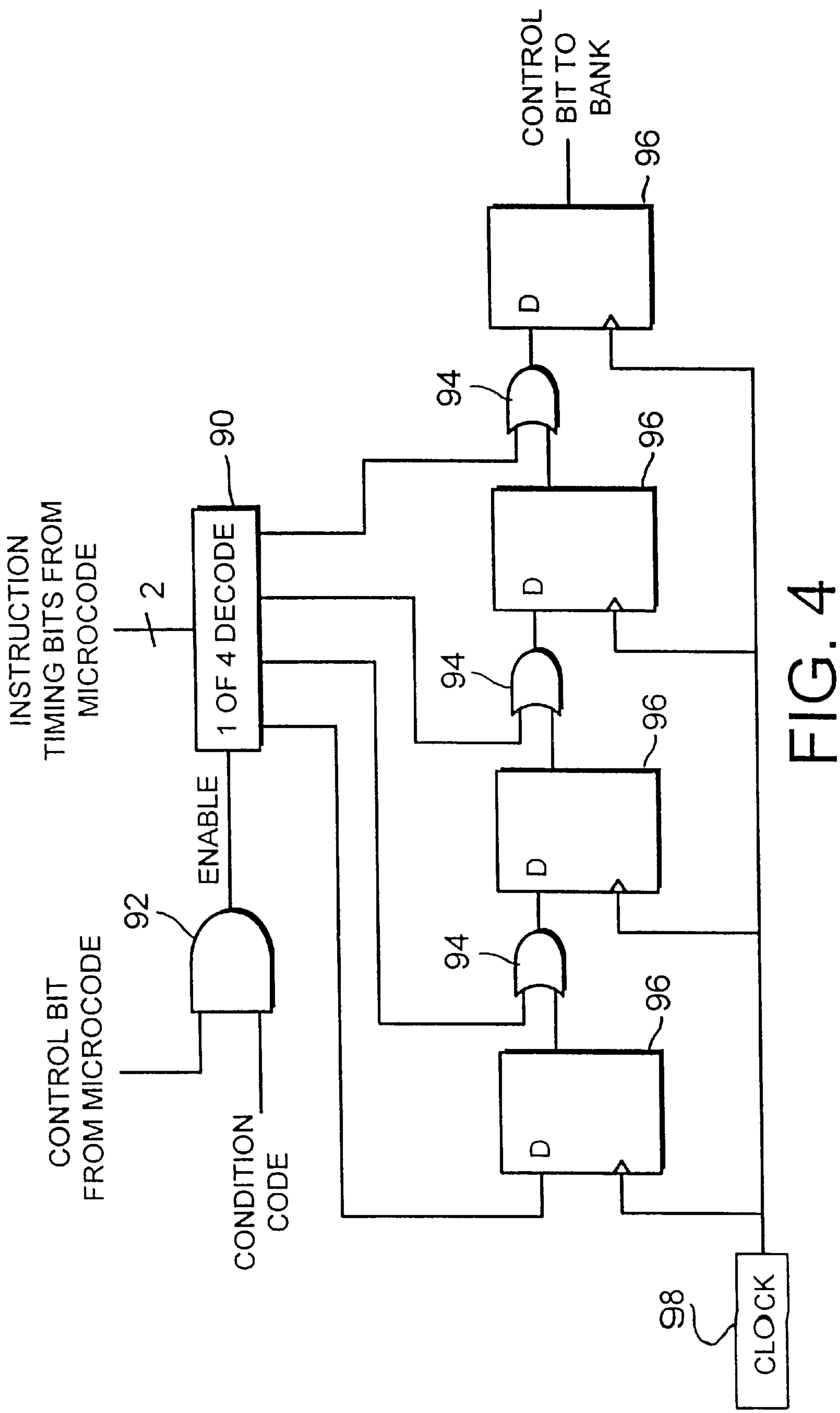
FIG. 4 is a block diagram of the control unit instruction pipeline the Media Control Core.

The data path control pipeline shown in FIG. 4 operates by allowing fields of a microinstruction word to be placed into a pipeline at different depths. This allows a microinstruction to control the flow of data through the pipeline over a number of clocks and hence to control the pipelined processing of data.

The circuitry of FIG. 4 comprises a 1 to 4 decoder 90 which on its enable input receives the output of an AND gate 92. The inputs to this are a control bit from the microcode instruction and a condition code used for conditional execution of instructions. A pair of timing bits from the microcode instruction which are the output selection inputs to the decoder 90. The four outputs of the decoder 90 form inputs via OR gates 94 to four D-type flip-flops 96 arranged as a shift register. The outputs from decoder 90 are ORed in gates 94 with the outputs of the previous flip-flop 96 in the register (output from the first flip-flop 96). Bits are clocked along the register by a clock 98 unitl they emerge as an output control bit which commences execution of the microcode instruction.

Thus a control bit is inserted into the correct position in its scheduling pipeline such that it arrives at the destination bank on the required clock cycle. Conceptually such an instruction bit pipeline exists for all microcode control bits but in order to limit the amount of logic needed to implement the control pipeline, there are limitations on the clock cycles on which some fields of the microcode can be placed.

Conditional execution is achieved by specifying a conditional operation and generating the condition bit. Two types of conditional operation are supported. This first is to qualify the write enable pulse to a bank with the condition code from the same or another bank. The second is to specify that a microinstruction word would be run again (rather than the next instruction from the program counter) if a certain condition code is true. In order to limit the number of possibilities for condition codes, only data bank condition codes can be used in these conditional operations.

Example Microinstruction Format

The following gives an example of a microinstruction format for this architecture and explains how it is used to achieve multithreading on a cycle by cycle basis.

In FIG. 6 a number of thread's microinstructions are shown. Each contains the following:

Control fields for each bank e.g. Register select bits and ALU control bits;

Instruction timing bits for each bank—these are explained below;

Routing control bits which control routing of data between banks;

Core control bits such as whether the instruction should be conditionally repeated and whether it contains immediate data operands.

For performance, instructions are allowed to execute over a number of clock cycles. The time at which parts of the instruction executes is set by delay bits within the bank control field which control the position that the control bits are placed in the Control Unit Instruction Pipeline (FIG. 6).

Because the control bits have been placed in the Instruction Pipeline which represents the future state of the Media Control Core, the control unit logic is able to ensure that the instruction delay is catered for when resource checking and that an instruction will cause no conflicts on any of the clock cycles in which it is executing.

Execution Dependencies

In order to keep the hardware design complexity down, instructions are allowed to execute over a number of clock cycles. The time at which parts of the instruction executes is controlled by delay bits within the bank control field.

In order to ensure both that this instruction delay is catered for each clock when the resource checking is undertaken and that the operation happens on the correct cycle the op-code corresponding to the delay bits is fed into a set of latches which are clocked each cycle. The outputs of these latches represent the future state of the data pipeline and are fed into the resource checking logic to ensure that an instruction will cause no conflicts on any of the clock cycles in which it is executing.

Banked Cache

Figure 7:
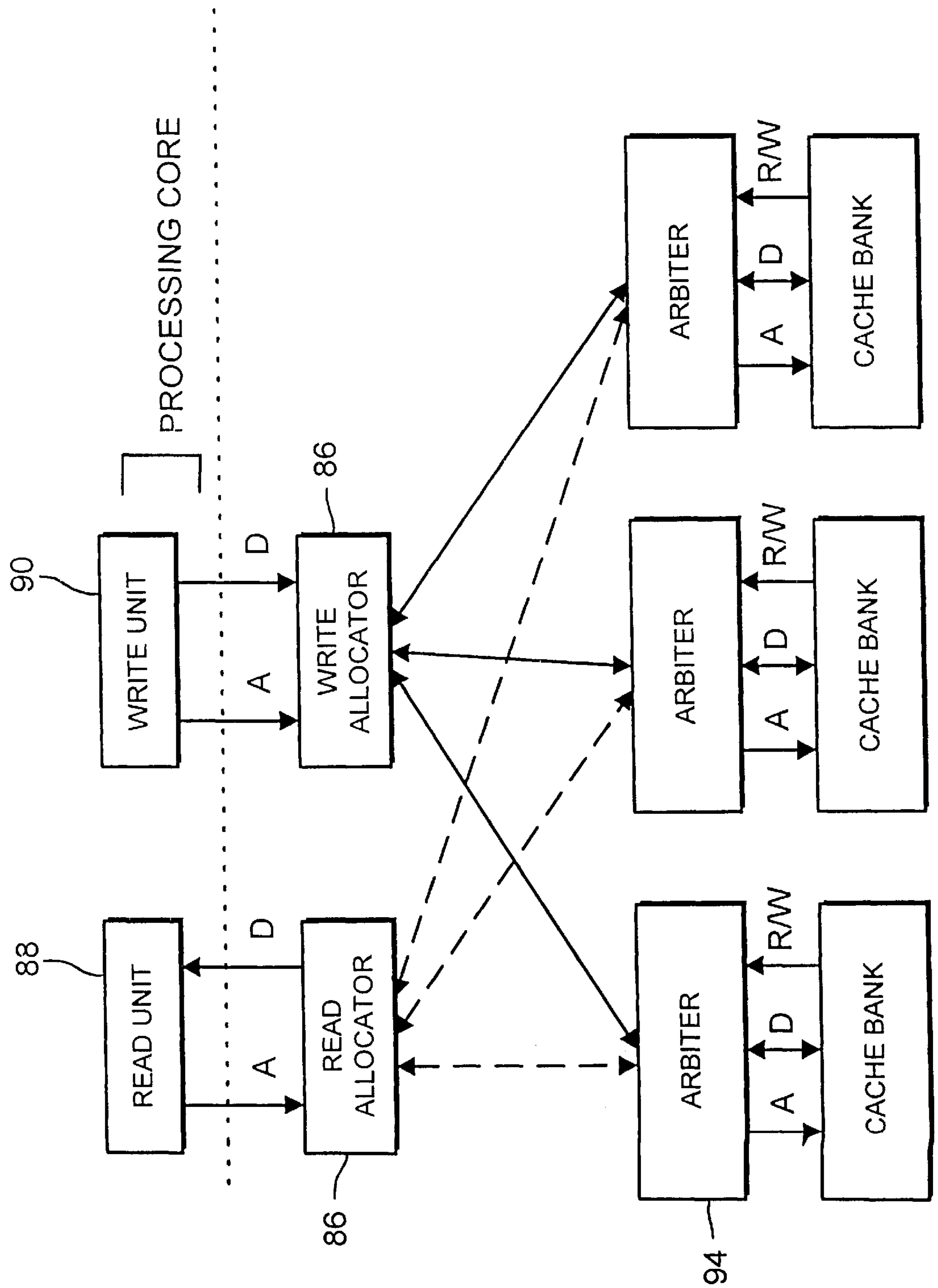
FIG. 7 is a block diagram showing how access is made to the banked cache memory of FIG. 1.

The multibanked cache is formed from a number of cache banks and interfaces to processing units and memory as shown in FIG. 7. In order to support an arbitrarily scalable device a multiplicity of cache banks are used. The use of each bank is controlled by a cache allocator 86 associated with a cache user such a read unit, or a write unit. These may be programmably controlled to use the cache banks in different configurations. For example, one bank may be used for command data, another for 3D texture maps, and a third for 2D parameters. The ability to configure the cache banks is important in achieving good memory performance.

Each port such as a read unit 88 or a write unit 90 which requires access to the cache is connected to an allocator module 86. These modules examine the memory request that is being made by the port and route the request to the appropriate cache bank. The address sent from the port is compared with a base range register pair in the write allocator to determine whether or not the address falls within a given region. If a match occurs then the request is forwarded to the cache bank. If no match occurs, a default cache bank is used. This comprises simply passing the request through to the memory sub-system.

More than one set of base and range registers may be used, depending on the memory requirements of the module connected to the port.

Not all of the cache banks provided need to be accessible from every given allocator. Some ports will need more flexibility than others. This fact allows the number of cache banks to be easily scaled (increased) whilst restricting the growth of interconnections required between allocators and cache banks. Thus, a set of caches might be allocated to deal with video input requests and audio inputs and outputs whilst others could be allocated to deal primarily with data fetches from main memory.

Each cache bank is connected to read and write allocators via an arbiter 94. The arbiter 94 receives requests for access from all of the allocators and can then determine which allocator is to obtain access to that is particular cache bank. This is done by assigning a priority to each port and arranging for the arbiter to simply process the highest priority request that is outstanding.

The system can be extended to use other types of inputs such as MPEG and video conferencing.

We claim:

1. A data processing management system for executing independent instruction threads comprising:

a plurality of data inputs;

a plurality of data outputs;

a data storage means;

a plurality of data processing means, each said data processing means capable of performing data processing operations to execute the instructions that form at least one of the instruction threads; and a control means;

wherein the control means comprises:

means for selectively routing data in a routing operation selected from a plurality of routing operations, wherein, in each routing operation, the data is routed between a selected one of said data inputs, a selected one of said data outputs, a selected one of said data processing means and/or said data storage means;

means for causing said data processing means to which the data is routed to commence a predetermined data processing operation based on an instruction from a selected one of the instruction threads;

means for repeatedly determining which routing operations and which data processing operations are capable of being performed;

means for commencing execution of at least one of the determined routing operations or data processing operations capable of being performed.

2. The data processing management system according to claim 1, including:

means for assigning a priority to each routing operation and data processing operation capable of being performed; and means for determining which of the routing operations and data processing operations capable of being performed has the highest assigned priority wherein said means for commencing execution is configured to initiate execution of the routing operation or data processing operation with the highest assigned priority.

3. The data processing management system according to claim 2, in which at least one data input is a real time input and an operation of receiving data on that data input is assigned the highest priority.

4. The data processing management system according to claim 3, in which the real time data input is a video data input.

5. The data processing management system according to claim 3, in which the real time data input is an audio input.

6. The data processing management system according to claim 2, in which said means for repeatedly determining which routing operations and which data processing operations are capable of being performed and said means for determining which of the operations capable of being performed has the highest assigned priority are collectively configured to determine which operations are capable of being performed and, of the operations capable of being performed, the operation with the highest priority, on each clock cycle of a clocking means associated with the control means.

7. The data processing management system of claim 6, wherein said means for commencing execution of the routing operating or data processing operation to be performed is configured to initiate the routing operation or data processing operation capable of being performed that has the highest priority on a succeeding clock cycle after it is determined that the operation is capable of being performed and has the highest priority.

8. The data processing management system according to claim 1, in which said means for determining which routing operations and data processing operations are capable of being performed makes this determination from resource status bits received via a status bus and generated by said control means and/or by a resources external from said control means.

9. The data processing management system according to claim 1, wherein each said data processing means includes a store of microcoded instructions relating to a processing operation to be performed by said data processing means.

10. The data processing management system according to claim 9, wherein said means for commencing execution of the operation to be performed is configured to commence execution of the operation by providing an address offset into said microcode instruction store of said data processing means that is to perform the operation.

11. The data processing management system according to claim 1, in which said data storage means comprises a cache memory means.

12. The data processing management system according to claim 11, in which said cache memory means comprises a plurality of banks of cache memory storage.

13. The data processing management system according to claim 12, wherein said cache memory means includes at least one cache memory allocation means which is configured to selectively permit read and write access to different said banks of said cache memory.

14. The data processing management system according to claim 1, in which said control means includes a plurality of data banks, each said data bank having a processing unit configured to process data internal to said control means.

15. The data processing management system according to claim 14, in which said control means includes a plurality of address banks, one for each of the data processing operations to be performed by the system.

16. The data processing management system according to claim 15, in which said control means includes a program counter bank for storing a current program address for the data processing operation of each instruction thread executed.

17. The data processing management system according to claim 16, in which said control means includes a set of input/output banks for interfacing with said plurality of data inputs and said plurality of data outputs.

18. The data processing management system according to claim 17, in which said control means includes a plurality of read/write banks for reading data from and writing data to said storage means.

19. The data processing management system according to claim 18, in which said data banks, said address banks, said program counter bank, said input/output banks, and said read/write banks are all connected to a common status bus a common data interconnect and a common control bus.

20. The data processing management system according to claim 14, wherein each said data bank comprises an arithmetic logic unit that functions as said processing unit for said data bank and a register file associated only with that said arithmetic logic unit.

21. A data processing management system comprising:

a plurality of data inputs;

a plurality of data outputs;

a plurality of data processing means;

a data storage means; and a control means wherein, the control means comprises:

means for routing data from each said data input to a selected one of said data outputs through a selected one of said data processing means in a plurality of routing operations;

means for causing each said data processing means through which the data is routed to perform a data processing operation on the data;

means for repeatedly determining which routing operations, from a plurality of routing operations, and which data processing operations, from a plurality of data processing operations, are capable of being performed; and means for commencing execution of the routing operations and the data processing operations that said means for determining which operations can be performed has determined can be performed.

22. The data processing management system of claim 21, including:

means for assigning a priority to each routing operation and each data processing operation; and means for determining which of the routing operations and which of the data processing operations capable of being performed has the highest assigned priority; and wherein, said means for commencing execution of the operations is configured to commence execution of the routing operation or the data processing operation with the highest assigned priority.

23. The data processing management system of claim 22, wherein said means for repeatedly determining which operations can be performed and said means for determining which operations capable of being performed has the highest priority are collectively configured to determine which routing operations and data processing operations are capable of being performed, and which of those operations have the highest priority during each clock cycle of a clocking means integral with said control means.

24. The data processing management system of claim 23, wherein:

said plurality of data processing means are configured to independently and simultaneously perform data processing operations on data in order to execute separate instructions that form part of separate instruction threads; and said control means is configured so that, while said plurality of data processing means are performing the data processing operations, said control means simultaneously determines which of the routing operations and data processing operations are capable of being performed and, of the operations capable of being performed, which operations have the highest priority.

25. The data processing management system of claim 21, wherein said means for repeatedly determining which operations can be performed is configured to determine which routing operations and data processing operations are capable of being performed during each clock cycle of a clocking means integral with said control means.

26. A method of independently executing separate instruction threads, wherein data that are to be processed based on each instruction thread is provided from one of a plurality of data inputs and data produced as a result of the processing of the instruction thread is forwarded to one of a plurality of data outputs, said method comprising the steps of:

for each instruction thread, for the next processing step to be executed in the thread, assembling a thread microinstruction that includes: an opcode that indicates the processing step to be performed; and at least one operand describing or defining the data on which the processing step is to be performed and the resources required to execute the instruction;

for the plurality of thread microinstructions, establishing a relative order of priority in which the microinstructions are to be executed;

for each thread microinstruction, determining if the resources are available to execute the microinstruction based on the data for the microinstruction that defines the required resources and a check of the availability of the resources so that a determination is made if the microinstruction is capable of execution;

for the thread microinstructions capable of execution, determining which of the thread microinstructions has the highest priority; and for the thread microinstruction with the highest priority, based on the opcode of the thread microinstruction: retrieving the data to be processed from a selective one of the data inputs; processing the data in a data processing means; and/or forwarding the data to selected one of the data outputs.

27. The method of executing instruction threads of claim 26, wherein, while the data processing means is executing the microinstruction, simultaneously performing said steps of determining the availability of resources to perform the next thread microinstructions and, for the thread microinstructions for which all the resources available, the thread microinstruction with the highest priority.

28. The method of executing instruction threads of claim 27, wherein:

a plurality of separate data processing means are provided;

after said step of determining the thread microinstructions having the highest priority, the thread microinstructions with the highest priority are sent to any one of a number of said data processing means for execution; and said individual data processing means simultaneously execute the thread microinstructions of different ones of the instruction threads.

29. The method of executing instruction threads of claim 28, wherein a cache memory is provided and wherein data is written to said cache memory from the data inputs, the individual data processing means read data from and write data to said cache memory during the processing of the thread microinstructions, data is read from the cache memory to the data outputs and the cache memory means has plural memory locations from which plural ones of the data inputs can write data to, plural ones of the data processing means can both read data from and write data to, and/or from which data can be read to plural ones of the data outputs.

30. The method of execution instruction threads of claim 26, wherein:

the data processing means has a memory in which microinstructions executed by the data processing means are stored; and when said step of processing data with the data processing means is to be executed, an offset address in the microinstruction memory of the data processing means is supplied to the data processing means, wherein said offset address is based on the thread microinstruction to be executed, and wherein the receipt of the offset address by the data processing means causes the data processing means to processes the data in accordance with the data processing means microinstruction specified by the offset address.

* * * * *

UNITED STATES PATENT AND TRADEMARK OFFICE
CERTIFICATE OF CORRECTION

PATENT NO. : 5,968,167
DATED : October 19, 1999
INVENTOR(S) : James Robert Whittaker, et al.

It is certified that error appears in the above-identified patent and that said Letters Patent is hereby corrected as shown below:

On the title page, insert item:

---[30] FOREIGN APPLICATION PRIORTY DATA
April 4, 1996 [UK] United Kingdom......9607153.5---.

Signed and Sealed this

Twenty-ninth Day of August, 2000

Attest:

Q. TODD DICKINSON

Attesting Officer

*Director of Patents and Trademarks*